April 14, 1953 — J. J. POWERS — 2,634,494

METHOD OF MANUFACTURING VEHICULAR BODIES

Filed Oct. 17, 1947 — 2 SHEETS—SHEET 1

INVENTOR
JOHN J. POWERS
BY *Alfred W. Petchaft*
ATTORNEY

April 14, 1953   J. J. POWERS   2,634,494
METHOD OF MANUFACTURING VEHICULAR BODIES
Filed Oct. 17, 1947   2 SHEETS—SHEET 2
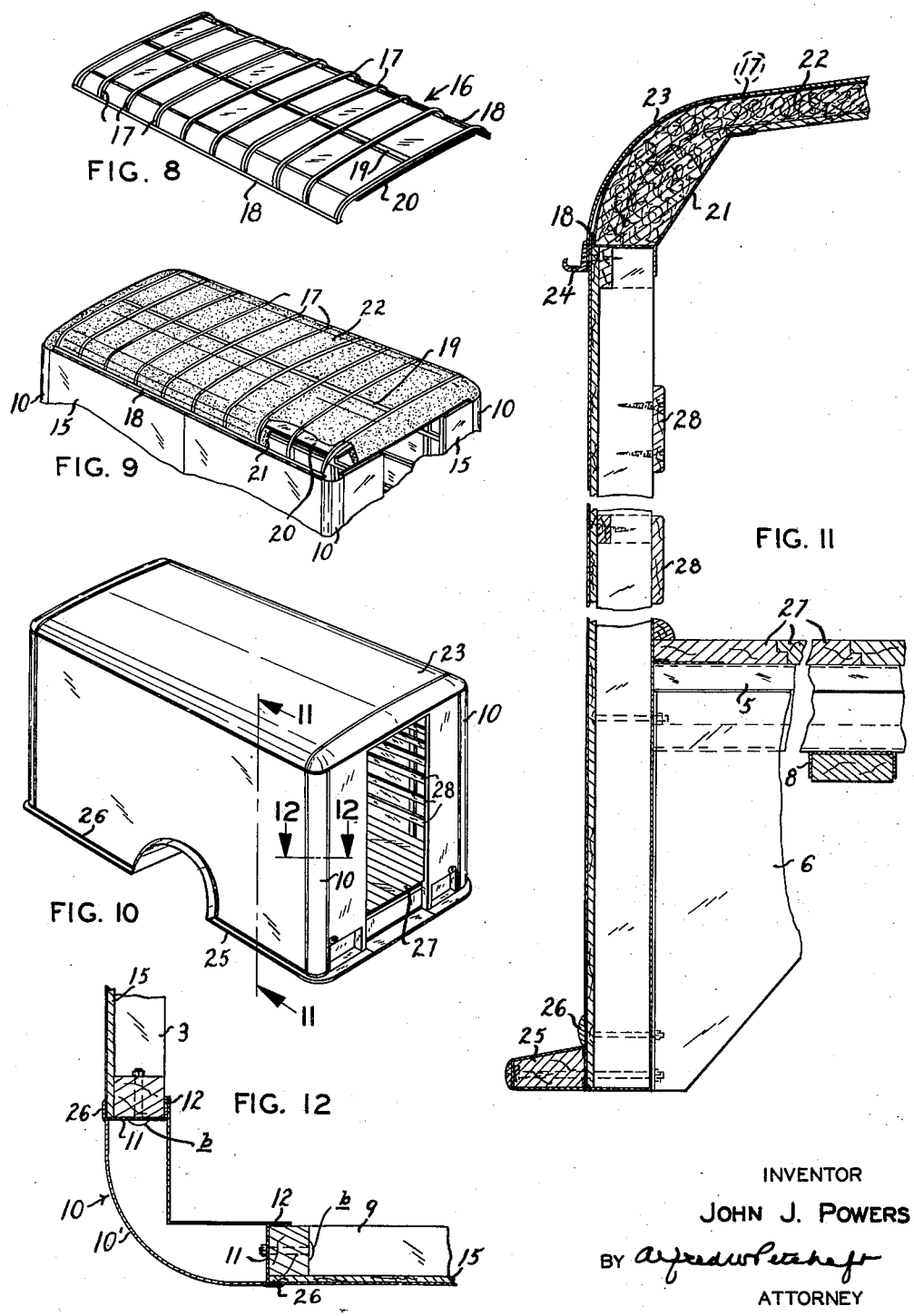
INVENTOR
JOHN J. POWERS
BY
ATTORNEY Patented Apr. 14, 1953

2,634,494

UNITED STATES PATENT OFFICE 2,634,494

METHOD OF MANUFACTURING VEHICULAR BODIES

John J. Powers, University City, Mo.

Application October 17, 1947, Serial No. 780,376

1 Claim. (Cl. 29—152)

This invention relates in general to certain new and useful improvements in vehicular bodies and methods for manufacturing the same.

The construction of bodies for trucks and other types of commercial vehicles has, up to the present time, been a comparatively expensive operation inasmuch as practically all bodies are custom made to suit the particular requirements of the vehicle owner. In the commercial vehicle body industry, it has been virtually impossible to achieve standardization or production line methods. Not only do the bodies of different users vary in size and shape, but frequently commercial fleet operators have various different types of truck bodies which are specially designed for particular purposes. Consequently, manufacturers of bodies for commercial vehicles usually build each body to a unique specification. Occasionally, a purchaser will order several identical bodies at one time, in which case it is possible to build all the bodies comprising such an order as a single production unit, but even with such a unit there is little practical possibility for production line economies.

It is hence the primary object of the present invention to provide a method for the construction of commercial vehicles which, by reason of standardization of parts and procedures, makes possible economy of cost and reduction in manufacturing time, substantially approximating the economies achieved by production line methods.

It is a further object of the present invention to provide a process for the construction of commercial vehicular bodies which are unusually rugged and durable and can be readily adapted to a wide variety of different designs and arrangements, depending upon the particular purposes for which the vehicle will be used.

It is also an object of the present invention to provide a unique type of vehicular body which is unusually rugged and durable and can be adapted to a wide variety of different designs and arrangements to suit particular uses and needs.

With the above and other objects in view, my invention resides in the novel features of form, construction, arrangement, and combination of parts presently described and pointed out in the claim.

In the accompanying drawings (two sheets),

Figure 1 is a perspective view of the sub-frame forming the first stage in the production of commercial vehicular bodies in accordance with the present invention;

Figures 2 and 3 are fragmentary cross-sectional views taken along lines 2—2 and 3—3, respectively, of Figure 1;

Figure 8 is a perspective view of the roof frame, the construction of which constitutes a part of the process of the present invention;

Figure 9 is a fragmentary perspective view of the upper portion of the partly completed body with the roof frame in place and insulated;

Figure 10 is a perspective view of the vehicle body with the roof covering in place; and Figures 11 and 12 are fragmentary sectional views taken along lines 11—11 and 12—12, respectively, of Figure 10.

Broadly speaking, the present process comprises the formation of a sub-frame or under-carriage which is made up of a series of channel-shaped sheet metal members suitably welded together and so designed as to lend themselves readily to the formation of a sub-frame of any desired size and shape by the simple expedient of cutting off the component members to selected lengths. Thereupon, a uniquely designed corner post member, also formed of sheet metal, is welded to the four corners of the sub-frame and similarly the four corner post members can be readily cut off to any desired length for the provision of a vehicle body having any desired vertical height. Next in order, wall framing is set in to the sub-frame between the four corner post members and sheathing applied thereto. Finally, a roof frame is fabricated, set in place, and covered to complete the basic body structure, which is then ready to be sanded and painted and mounted upon the vehicle chassis.

Figure 1:
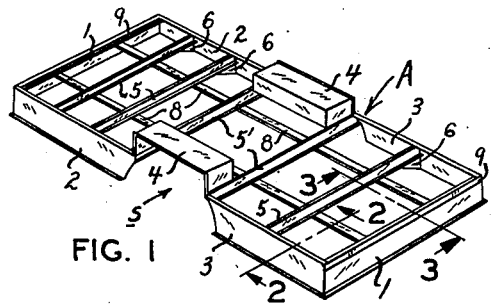
Figure 2:
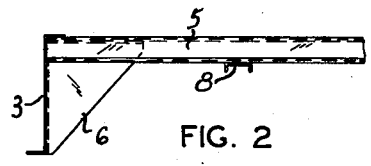
Figure 3:
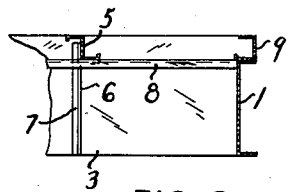
Figure 5:
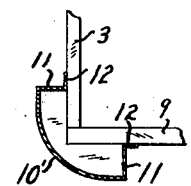
Figure 5 is a fragmentary transverse sectional view taken along line 5—5 of Figure 4.

Referring now in more detail, and by reference characters to the drawings, which illustrate the present process in its progressive stages, Figure 1 depicts a sub-frame or under-carriage A composed of a plurality of channel-shaped structural members formed of heavy gauge sheet metal preferably upon a power break. The external framing comprises shallow U-shaped channel sections which are cut to suitable length to provide end members 1 and somewhat wider S-shaped channel sections similarly cut to suitable length to provide side members 2, 2, 3, 3, the latter preferably having webs of somewhat greater width than the webs of the end members 1. The side members 2, 2, 3, 3, are arcuately cut off in the region of the center of the body at some suitable points to provide the clearance space s for the vehicle wheels and are endwise connected to each other by box-like internal fenders 4, also fabricated of sheet metal and endwise welded at their outer lower corners to the members 2, 3. The transversely aligned pairs of member 2, 2, and 3, 3, are cross-connected by S-shaped channel members 5 welded endwise to the inner faces of the members 2, 2, 3, 3, and reinforced at such points of welded juncture by triangular gusset plates 6 having narrow inturned welding flanges 7 by which the gusset plates 6 are secured to the inner faces of the side members 2, 2, and 3, 3. Finally, the cross-members 5 are interconnected by shallow U-shaped stringer channels 8 welded to the under faces of the bottom flanges of the cross members 5, all as best seen in Figures 1, 2, and 3.

It will be noted that the arcuately cut off inner ends of the side members 2, 2, 3, 3, are cross-connected by S-shaped channel members 5' welded thereto at their ends but have no reinforcing gusset plates and the box-like internal fenders 4 are also welded to these members 5'. Finally, the framing is completed by welding to the top flanges of the end members an inwardly opening U-shaped channel 9 having a web, the height of which is substantially equal to the difference in height between the webs of the end members 1 and the webs of the side members 2, 2, 3, 3, so that the top flange of the channel 9 lies in substantially the same plane as the top flange of the side members 2, 2, 3, 3.

Figure 4:
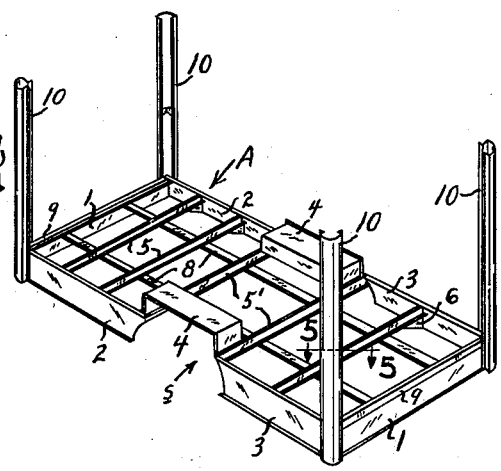
Figure 4 is a perspective view of the sub-frame with four corner posts mounted thereon, illustrating the second stage of the present process.

Formed of heavy gauge sheet metal in some suitable standard length is a quarter-round corner post forming channel section which, if necessary, may be cut off to form corners posts 10 having any suitable length, depending upon the desired height of the vehicle body. The corner posts 10 thus comprise a central arcuate web 10' and inturned flanges 11 disposed at right angles to each other and lying along the radius of the curve of the arcuate web 10'. The flanges 11 are bent outwardly at right angles adjacent to their outer longitudinal margins in the provision of outturned marginal flanges 12. The corner posts 10 are welded along the abutting portions of the flanges 12 to the corners of the base frame or under-carriage, as shown in Figure 4.

Figure 6:
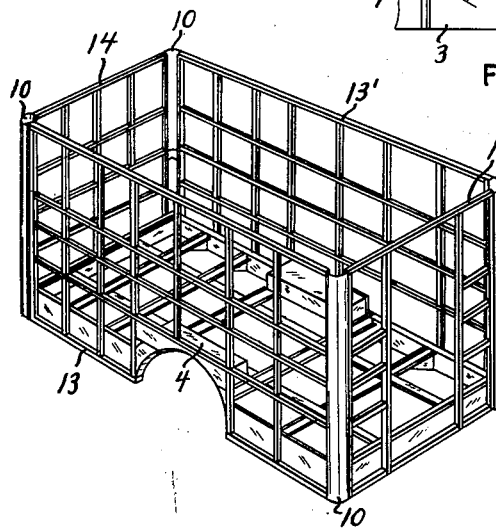
Figure 6 is a perspective view of the partly constructed vehicle body with the side wall framing in place, illustrating the third stage of construction according to the present process.
Figure 7:
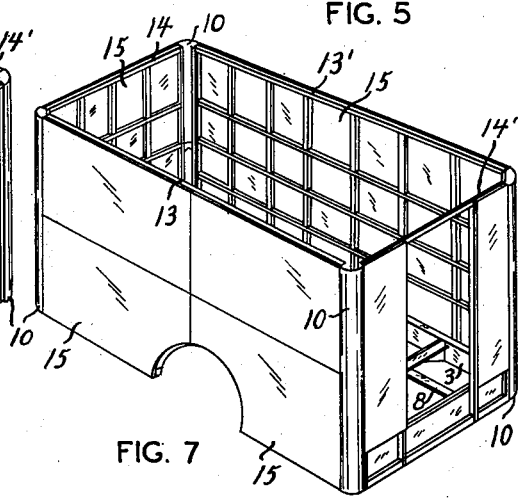
Figure 7 is a perspective view of the partially constructed vehicle body with the external sheathing in place, illustrating the fourth stage of the present process.

Constructed to the desired dimensions, preferably of interlocked and mortised two-inch oak strips, are rectangular grid-like side wall frames 13, 13', 14, 14', which may be snugly slid into the channel ways formed by the flanges 11, 12, and allowed to rest upon the outturned flanges of the side frame members 2, 2, 3, 3, as shown in Figure 6. The frames 13, 13', 14, 14', are secured in place by bolts b, which extend through the flanges 11 of the corner posts 10, as best seen in Figure 12. Thereupon, either plywood or sheet metal sheathing panels 15 are suitably secured upon the external faces of the frames 13, 13', 14, 14', with the outer surfaces thereof substantially tangential to the curved webs 10' of the corner posts 10, as shown in Figure 7.

A roof frame 16 is separately fabricated to such outer rectangular dimensions as will properly fit closure-wise over and on top of the partially completed vehicle body and comprises a plurality of bowed transverse ribs 17 endwise welded to bottom stringers 18 and reinforced by a central stringer 19, both stringers 18, 19, preferably being formed of sheet metal channels. A suitable plywood or sheet metal ceiling panel 20 is secured to the under face of the ribs 17 across the straight portions of their span between the bowed ends, as shown in Figure 8. This roof frame 16 is thereupon secured over and on top of the vehicle frame, as shown in Figure 9, and welded at its corners to the upper ends of the corner posts 10. An angular sheet metal facia strip 21 is rigidly mounted between the inner flange of the stringers 18 and the outer edges of the ceiling panels 20, as best seen in Figure 11. Thereupon, suitable diathermanous insulation material 22 is placed in the roof structure and a fabric or sheet metal roofing skin 23 is conventionally stretched over the roof frame 16.

Next in order, a gutter-forming trim bead 24 is screwed or otherwise suitably secured across the horizontal meeting line between the roof and the body side walls and a conventional bumper rail 25 and bottom trim bead 26 are secured along the bottom edges of the side walls, also as shown in Figure 11. Finally, conventional floor boards 27 are laid upon the upper faces of the cross members 5 on the interior of the vehicle body and suitably spaced side wall rails 28 are conventionally secured to the inner faces of the wall frames 13, 13', to form a completed vehicle body, as shown in Figure 10. The vehicle body thus completed may then be mounted upon a vehicle chassis and finished in any conventional manner by usual painting and finishing methods.

It should be particularly noted that the various members which form the component parts of the vehicle body above described are all formed of heavy gauge sheet metal in long channel-like members and can be readily and speedily cut to any desired length. Consequently, with the several basic channel-like shapes, a vehicle body of any particular length, width, or height can be very simply constructed.

It should be understood that changes and modifications in the form, construction, arrangement, and combination of the various members which form the component parts of the vehicle body and in the steps of their production may be made and substituted for those herein shown and described without departing from the nature and principle of my invention.

Having thus described my invention, what I claim and desire to secure by Letters Patent is:

The method of making a commercial vehicle body which comprises forming a plurality of U-shaped sheet metal channels having a relatively wide flat web, cutting said channels to suitable lengths and welding them together at their ends to form a rectangular sub-frame with the webs disposed vertically so that the sub-frame will have outwardly presented flush faces, forming four sheet metal corner posts of equal length, said corner posts including a quarter-round section having longitudinal margins provided with U-shaped channel-portions the webs of which are substantially radial to the quarter-round section and terminate in flanges which are, in turn, at right angles to the webs and spaced inwardly from the longitudinal margins of the quarter-round section, welding one of said corner posts uprightly at its lower end to each of the corners of the sub-frame so that the inwardly spaced flanges of such corner post are flush against the vertical flush faces of the sub-frame and the sharp corner of the sub-frame is housed within and concealed by the quarter-round section, forming unitary side frames each as an entirely self-supporting rigid structure having a height substantially equal to the height of the corner posts and lengths respectively equal to the distances between the juxta-posed U-shaped channel portions of the corner posts so as to fit snugly therebetween, said side sections being of sufficient thickness so that their outwardly presented faces are substantially tangent to the outwardly presented surfaces of the quarter-round sections of the corner posts, securing said side frames in vertical position between the corner posts with their vertical margins secured within the U-shaped channel portions of the corner posts, forming a unitary roof frame, and securing said roof frame to the upper ends of the corner posts and to the upper horizontal margins of the side frames.

JOHN J. POWERS.

References Cited in the file of this patent

UNITED STATES PATENTS

| Number | Name | Date |
|---|---|---|
| 180,005 | Cooke et al. | July 18, 1876 |
| 322,050 | Emery | July 14, 1885 |
| 1,545,456 | Rastetter | July 7, 1925 |
| 1,793,928 | Hammel | Feb. 24, 1931 |
| 1,877,653 | Fageol | Sept. 13, 1932 |
| 2,140,268 | Moss | Dec. 13, 1938 |
| 2,154,596 | Widman | Apr. 18, 1939 |
| 2,389,907 | Helmuth | Nov. 27, 1945 |
| 2,405,793 | Lohse | Aug. 13, 1946 |